Jan. 30, 1968 V. J. MARINO 3,365,850
DIMENSIONALLY STABLE WOOD FLOORING
Filed March 3, 1965
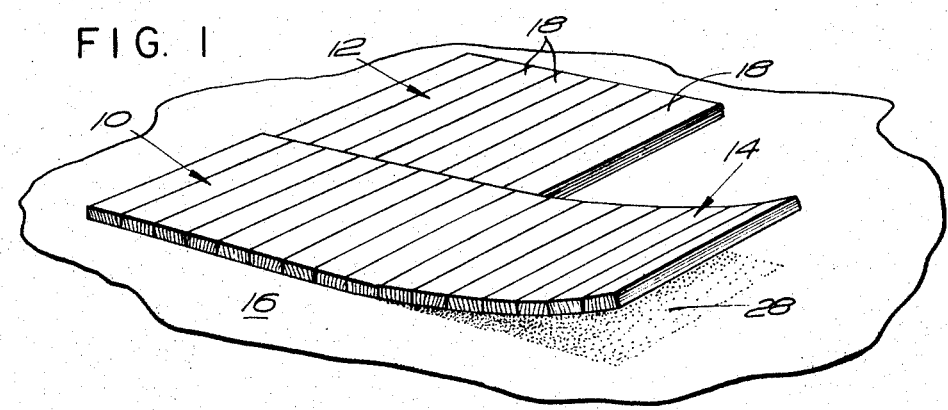
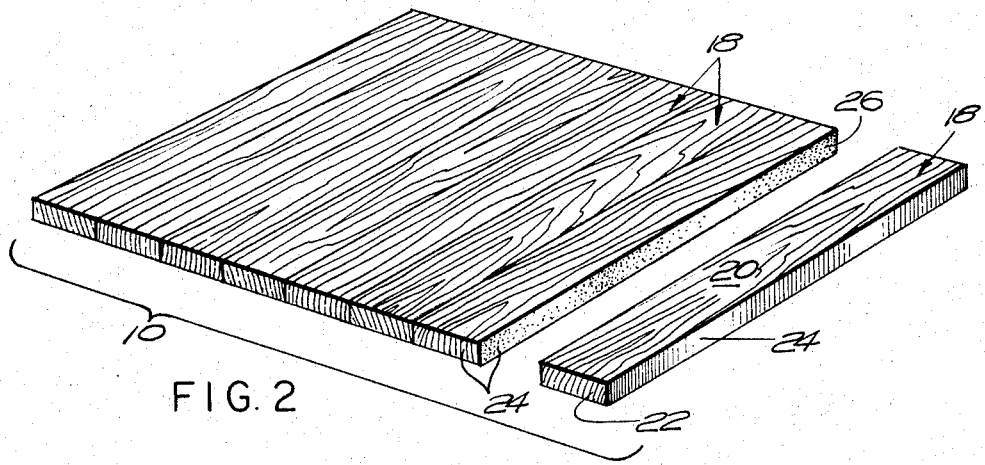
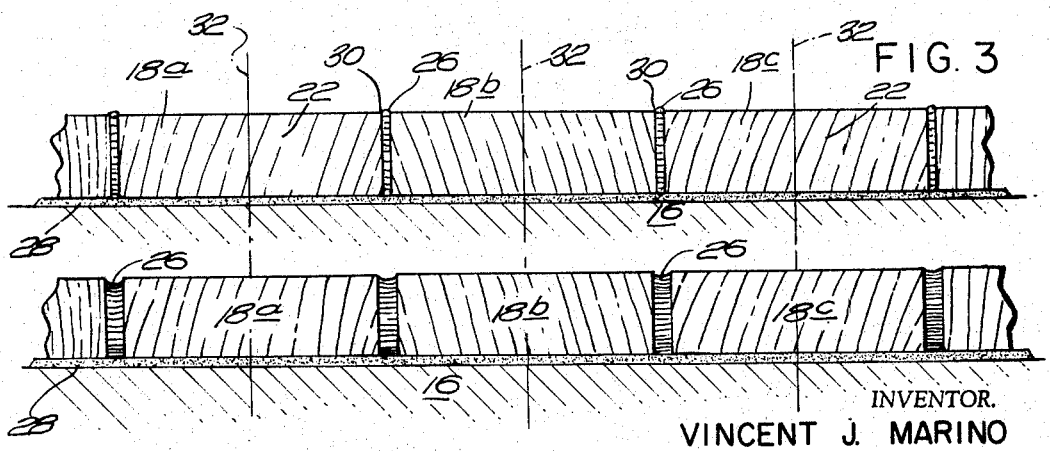
INVENTOR.
VINCENT J. MARINO
BY
*Blair & Buckles*
ATTORNEYS 3,365,850
DIMENSIONALLY STABLE WOOD
FLOORING
Vincent J. Marino, Beverly Farms, Mass. (% Mari &
Sons Flooring Co., Inc., 38 Kent St., Somerville,
Mass. 02143)
Filed Mar. 3, 1965, Ser. No. 436,759
6 Claims. (Cl. 52—309)

ABSTRACT OF THE DISCLOSURE

A wood flooring resistant to deterioration due to the dimensional instability of wood is constructed of wood fillets that have limited width and are oriented with the edge grain as the wearing surface and with each fillet adhered to the laterally adjacent fillets by a material that itself absorbs dimensional changes of the contiguous fillets. The flooring is installed with an adhesive that anchors each fillet to the subfloor essentially immovable under lateral compressive stresses.

---

This invention relates to a wood flooring highly resistant to deterioration due to variations in environmental humidity and temperature.

More particularly, the flooring, which is made up of a plurality of wood fillets, combines a controlled fillet size and specific grain orientation with selected bonding material between adjacent fillets and adhesive between the fillets and the subfloor to withstand hard usage in environments having adverse temperatures and humidity conditions. Moreover, the flooring is long wearang and can be manufactured and installed at relatively low cost.

It is well known that wood expands and contracts substantially when exposed to changes in temperature and humidity. This dimensional instability has been a serious problem in prior wood floors, especially those in which the wood strips are adhered to a subfloor, as are parquet floors. When there is insufficient space between the wood strips, the floor buckles during expansion since the strips are forced against each other until their bond to the subfloor ruptures. In prior floors, the provision of expansion spaces within the floor, typically in the form of large gaps between adjacent strips, avoids this problem only temporarily. During cool, dry periods when the strips contract, the gaps increase further and become unsightly. Moreover, they become filled with dirt and grit so that under conditions where the wood expands, the gaps are no longer free to take up the expansion and the floor soon begins to buckle.

Numerous floor constructions have been attempted to overcome these problems. For example, wood floorings have been made with wood strips machined so that contiguous pieces interlock. Another effort has been to hold the strips together by bonding them to a backing that in turn is applied to the subfloor. Although such backings have generally been continuous, i.e. in sheet form, they have also taken the form of ties of metal, plastic and the like embedded across several contiguous strips.

The continuous backing sheets must be soft and flexible to preclude unbalanced stresses and hence avoid warping of the tiles before they are installed. Consequently, after the tiles are installed, the soft backing allows the strips to expand and contract independent of the subfloor. As a result, the backing tears and separates. Attempts to alleviate this problem by providing voids or openings in the backing through which adhesive is to bond the strips directly to the subfloor have proven ineffective. Furthermore, if a heavy bed of adhesive were used and each tile set in the optimum manner in order to fill all the voids with adhesive, the cost would be prohibitive and the bond strength would nevertheless be relatively small compared to the bond achieved with the present invention.

The use of interlocking wood strips and embedded ties increases by a factor of two or more the amount of wood required and it calls for considerable machining of the wood strips. Also, backing sheets and ties add to the material cost. Thus, these techniques are costly in terms of both material and labor.

In another flooring construction there is a cushion in the gap between the wood pieces, the cushion typically being in the form of an impregnated fibrous material intended to provide the necessary expansion space. However, these prior cushions harden, and thus become unable to absorb expansion of the wood components of the floor.

Accordingly, it is an object of the present invention to provide a low cost wood floor having a long useful life and requiring only minimal maintenance. It is a further object that the floor have a pleasing appearance and be essentially free of squeaks and like noises which develop when boards become loose.

Another object of the invetnion is to provide economical wood floor that resists deterioration due to repeated expansion and contraction under varying conditions of humidity and temperature.

It is also an object of the invention to provide wood flooring of the above type further characterized by low cost manufacture and installation. More particularly, it is an object to provide such flooring that can be made of wood pieces not previously considered suitable, that requires a minimum of shaping and cutting for the pieces, and is characterized by low cost preassembly and installations.

It is also an object of the invention to provide wood flooring suited for economic installation below grade, as in basements, and over subfloors that contain radiant heating structures.

A further object of the invention is to provide a wood floor of the above character from which a single wood piece can be removed, as for replacement, without disturbing the contiguous pieces.

The invention also has as an object the provision of wood flooring capable of a wide variety of parquet designs. The limited ability of prior parquet floorings to accommodate expansion and contraction restricts them to patterns wherein adjacent tiles are oriented with the wood grain running in alternate transverse directions.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

For a fuller understanding of the nature and objects of the invention, reference should be had to the following detailed description taken in connection with the accompanying drawings in which:

FIGURE 1 is a perspective view of the wood flooring during installation;

FIGURE 2 is a partly exploded view of a preassembled wood flooring tile embodying the invention;

FIGURE 3 is an end elevation view of the installed flooring under condition of extreme expansion; and FIGURE 4 is a similar view showing the flooring in a condition of extreme contraction.

The present wood flooring overcomes the prior art deficiencies and achieves the foregoing objects with a novel combination of wood fillet size, grain orientation, inter-fillet spacing, adhesive, and bonding material. More particularly, according to the invention the fillet size and gap widths are made quite small compared to those in the prior floorings and are so balanced with respect to each other that the gaps between the fillets are sufficiently small for the flooring to have a pleasing appearance and yet of sufficient width to prevent contiguous fillets from expanding into contact with each other under the most adverse conditions. Moreover, the fillets are cut and installed with a selected grain orientation for maximum dimensional stability, as well as high resistance to wear. In addition, a permanently flexible bonding material has been found to preassemble the fillets into flexible and self-supporting tiles. This bonding material fills the gap between fillets and freely flexes to accommodate the expansion and contraction of the fillets. The fillets are secured to the subfloor with an adhesive that anchors each fillet against any movement other than its own expansion and contraction.

More particularly, FIGURE 1 shows three tiles 10, 12, and 14 of the flooring, the tiles 10 and 12 having already been installed on a subfloor 16 and the tile 14 being in the process of installation. Each tile comprises a number of wood fillets 18 appropriately of rectangular cross section and relatively short length, typically six inches.

As shown in greater detail in the exploded view of the tile 10 in FIGURE 2, the wood grain in each fillet 18 runs along the fillet and the fillet is cut so that the edge grain surface is the wearing surface 20. That is, the lines 22 that demarcate the growth rings on the tree from which the fillets 18 are cut extend substantially between the upper and lower surfaces of each fillet. Hence the lateral surfaces 24 on each fillet are the flat grain surfaces.

The tile 10 has every fillet 18 arranged with its edge grain and flat grain oriented in this manner. This is because the dimensional stability transverse to the grain lines 22, i.e. in the direction of fillet width, is about twice the dimensional stability along the grain lines, i.e., in the direction of fillet thickness.

In addition to cutting the fillets 18 with the desired grain orientation, it is important that the maximum width of each fillet be around one inch; a ⅞ inch maximum width is preferred. The thickness of the fillets is not as critical as the width and can be as small as one-quarter of an inch. The upper limit on thickness is simply a matter of economy and the required wearing depth.

The fillets in each tile are joined together with bonding layers 26; the tile does not require a backing. Moreover, it is free of interlocking structures and rigid ties spanning the fillets as found in the prior art. As a result, the entire thickness of the present tile is available for wear.

A principal characteristic of the bonding layers 26 is that they are permanently flexible. The ability of the tile 14 in FIGURE 1 to flex during installation demonstrates one aspect of the flexibility of the layers 26. A suitable adhesive exhibiting this property, as well as the strength to make the tile self-supporting, is a chloroprene synthetic rubber compound consisting of two parts by weight of synthetic chloroprene rubber and one part of a synthetic resin. By way of example, suitable resins include pentaerythritol esters of rosin and pentaerythritol esters of hydrogenated rosin; one such resin has the commercial designation Hercules Powder Pentalyn A. The two constituents are dissolved and blended together. An anti-oxidant sufficient to prevent oxidation and brittleness is then added to the solution in the amount of one or two parts by weight to each 100 parts of the chloroprene compound. A suitable anti-oxidant is 2,2' methylenebis (4-methyl-6-tertiary-butyl phenol). The foregoing proportions of the chloroprene compound, resin and the anti-oxidant, are variable to produce the most satisfactory blend of adhesiveness and flexibility, as well as viscosity for ease in handling the bonding material. Again by way of example, the Webtex Company, Wilmington, Mass., designates one suitable bonding material as No. 1028SW.

The fillets 18 are preassembled with the edge bonding layers 26 to form the tiles 10, 12 and 14, with a gap of $\frac{1}{64}$ to $\frac{1}{32}$ inch between contiguous fillets. This gap width is generally just sufficient to accommodate the maximum dimensional change in fillet width. Hence, a smaller gap should generally be avoided and a larger gap has been found unnecessary and is unsightly; a gap larger than one-sixteenth inch is avoided because it admits grit that prevents the gap from closing when the fillets expand. This should be contrasted with the prior art floorings which are manufactured with considerably larger gaps of ⅛ inch and more. With a gap of the present size, it has been found that the bonding layers 26 continually spans and substantially fills the gaps under all conditions of fillet expansion and contraction. This is particularly important in excluding dirt from the gaps under extreme contraction.

The tiles are appropriately installed with a similar gap between them, as between the tiles 10 and 12 in FIGURE 1. As shown in FIGURE 1, the tiles are secured to the subfloor 16 with an adhesive 28 that firmly holds them in place against the forces that develop during the dimensional changes due to temperature and humidity. The adhesive, which is soft and buttery during installation and hardens to a non-brittle and shock resistant state, can, for example, be a polyvinyl acetate copolymer emulsion of highly thixotropic viscosity. A suitable adhesive is available from the National Starch and Chemical Corporation and is designated number 41–4903.

Turning now to FIGURE 3, the illustrated fillets 18a, 18b and 18c are under the condition of maximum expansion, as caused by high environmental temperature and humidity. However, gaps 30 still remain between adjacent fillets and continuous bonding layers 26 separate the fillets. Thus there is no accumulation of the expansion stresses developed in a number of consecutive fillets that could eventually break a fillet free from the subfloor 16.

FIGURE 4 shows the same fillets 18a–18c when fully contracted. The width of the gaps 30 is maximum, but the bonding layers 26, being flexible and elastic, continue to span the gaps and substantially fill them to preclude entry of dirt.

FIGURES 3 and 4 also illustrate the firm tenacity of the adhesive 28, which holds the fillets in place in spite of the dimensional instability. More particularly, when the fillets expand and contract between extreme conditions as shown in these figures, the adhesive 28 only yields sufficiently to accommodate expansion or contraction of individual fillets, so that fillet center lines, indicated at 32, remain fixed.

In summary, the novel parquet flooring described above employs rectangular wood fillets of uniquely small size and having a specified grain orientation in three orthogonal directions. The fillets are joined together into tiles with a permanently flexible and elastic bonding material which fills the gaps between the fillets. These gaps are of carefully controlled small width. This balanced structure limits the dimensional change of each fillet so that it does not bear against adjacent fillets and does not break loose from the subfloor. As a result, the flooring is remarkably resistant to deterioration from changes in the environmental conditions, particularly temperature and humidity. This minimizes maintenance of the flooring and enables it to be installed in a variety of places, many of which were heretofore considered unsuited for wood floorings.

Moreover, the tiles and even the fillets can be arranged in essentially any pattern and design desired. This feature, and the absence of large inter-fillet gaps, enable the flooring to provide decorative effects that were heretofore not practical.

The flooring is also characterized by remarkable economy in the cost of raw materials, in manufacturing and in installation. Specifically, the small size of the fillets makes it possible to use raw materials heretofore considered as unsuited for flooring.

Further, the thickness of the fillet is no greater than as required for wear. The thickness does not have to accommodate interlocking structures, whether formed integral with the wood or recessed into the wood as crossties. This feature alone reduces by 50 percent or more the amount of raw material required for the flooring. A dividend of this economy is that the flooring has relatively light weight and requires little storage space prior to installation.

The fabrication of the individual fillets and their preassembly into the tiles can also be carried out at low cost with relatively simple manufacturing equipment. Finally, the flooring is economical to install.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. A wood floor comprising wood fillets separated by gaps, said flooring being devoid of backing and of fillet-tieing structures, and being further characterized in that
   (A) each fillet
       (1) is elongated in the direction of the wood grain and has a rectangular transverse cross section,
       (2) is so oriented with respect to the wood grain that the edge grain face is the fillet wearing surface and the flat grain face extends transversely to the fillet width and length,
       (3) having a width no greater than approximately one inch and being spaced from the adjacent fillets by a gap having a width less than 0.06 inch and larger than 1/64 inch,
   (B) a bonding material fills said gaps and joins said fillets together, said material having substantially permanent flexibility and elasticity sufficient to accommodate changes in the widths of each said gap due to changes in the widths of said fillets contiguous therewith, and
   (C) an adhesive firmly securing each fillet to a subfloor and holding each fillet stationary on the subfloor when undergoing cycles of expansion and contraction.

2. A floor according to claim 1 further characterized in that
   (A) each fillet has a length no greater than approximately 0.5 feet,
   (B) said bonding material is a blend of chloroprene synthetic rubber, esterified rosin and anti-oxidant, and
   (C) said adhesive is a polyvinyl acetate copolymer emulsion.

3. A wood flooring tile resistant to deterioration due to dimensional instability of wood, said tile consisting essentially of
   (A) a plurality of wood fillets,
       (1) each fillet
           (a) being elongated in the direction of the grain,
           (b) having a substantially rectangular transverse cross section,
           (c) having a width no greater than approximately one inch and a thickness not materially less than 0.25 inch,
           (d) having an edge grain wearing surface, and
           (e) having a flat grain lateral surface between the wearing surface and the surface opposed thereto,
       (2) said fillets being separated from each other along the full lateral surfaces thereof, each separation having a maximum width substantially no greater than the maximum dimensional change in the widths of the fillets contiguous therewith, and
   (B) a flexible elastic bonding material substantially filling said separations, said bonding material
       (1) being substantially devoid of non-compressive filler constituents, and
       (2) maintaining sufficient flexibility and elasticity and adhesiveness to accommodate dimensional changes in the widths of the fillets it separates and thereby substantially continuously spanning and filling said gaps.

4. A flooring tile according to claim 2 in which said bonding material consists essentially of a blend of chloroprene synthetic rubber, rosin esterified with pentaerythritol, and an anti-oxidant.

5. A wood flooring tile characterized by resistance to deterioration due to the dimensional instability of wood, said tile comprising:
   (A) a plurality of wood fillets, each fillet
       (1) being elongated in the direction of the wood grain,
       (2) having a rectangular transverse cross-section,
       (3) being so oriented with respect to the wood grain that the edge grain face is the fillet wearing surface and the flat grain face extends transversely to the fillet width and length, and
       (4) having a width no greater than approximately one inch and a length no greater than approximately 0.5 feet,
   (B) said fillets being spaced apart by gaps having a width between 1/64 and 1/32, and
   (C) a bonding material filling said gaps as the exclusive material therein and joining said fillets together, said materail being a permanently flexible blend of chloroprene synthetic rubber, rosin esterified with pentaerythritol and an anti-oxidant.

6. A flooring tile according to claim 3 further characterized in that said fillet separations normally have a width less than 0.06 inch and substantially no less than (1/32) of an inch.

References Cited

UNITED STATES PATENTS

| | | | |
|---|---|---|---|
| 2,018,712 | 10/1935 | Elmendorf | 161—36 X |
| 2,026,511 | 12/1935 | Storm | 52—393 X |
| 2,376,854 | 5/1945 | Saunders | 52—403 X |

FOREIGN PATENTS

| | | |
|---|---|---|
| 101,894 | 1939 | Australia. |
| 1,054,127 | 1953 | France. |

JOHN E. MURTAGH, *Primary Examiner.*